(12) United States Patent
Wiese et al.

(10) Patent No.: US 6,284,116 B1
(45) Date of Patent: Sep. 4, 2001

(54) PROCESS FOR TREATING AQUEOUS SOLUTIONS COMPRISING BASES AND ORGANIC ACIDS

(75) Inventors: Klaus-Diether Wiese, Haltern; Antje Jakob, Verden Aller; Franz-Felix Kuppinger, Marl, all of (DE)

(73) Assignee: Degussa-Huels Aktiengesellschaft, Marl (DE)

( * ) Notice: Subject to any disclaimer, the term of this patent is extended or adjusted under 35 U.S.C. 154(b) by 0 days.

(21) Appl. No.: 09/429,955

(22) Filed: Oct. 29, 1999

(30) Foreign Application Priority Data

Oct. 29, 1998 (DE) ............................................ 198 49 922

(51) Int. Cl.$^7$ .................................................. B01D 61/44
(52) U.S. Cl. ........................................... 204/530; 204/534
(58) Field of Search ...................................... 204/530, 534

(56) References Cited

U.S. PATENT DOCUMENTS 2,829,095   4/1958   Oda et al. .

5,702,579 * 12/1997 Veits .................................... 204/534
5,993,629 * 11/1999 Gavach et al. ....................... 204/534

FOREIGN PATENT DOCUMENTS

| 39 26 634 A1 | 2/1990 | (DE) . |
|---|---|---|
| 196 04 903 A1 | 8/1997 | (DE) . |
| 0 176 698 A1 | 4/1986 | (EP) . |
| 0 242 784 A1 | 10/1987 | (EP) . |
| 0 838 435 A1 | 4/1998 | (EP) . |
| 787977 | 12/1957 | (GB) . |
| WO 92/07648 | 5/1992 | (WO) . |
| WO 93/25299 | 12/1993 | (WO) . |

* cited by examiner

Primary Examiner—Arun S. Phasge
(74) Attorney, Agent, or Firm—Oblon, Spivak, McClelland, Maier & Neustadt, P.C.

(57) ABSTRACT

Bases and organic acids are simultaneously separated from aqueous solutions comprising bases and organic acids by electrochemically treating aqueous solutions containing these components, particularly the aqueous waste solution obtained from an aldolization reaction.

20 Claims, 5 Drawing Sheets

PROCESS FOR TREATING AQUEOUS SOLUTIONS COMPRISING BASES AND ORGANIC ACIDS

BACKGROUND OF THE INVENTION

1. Field of the Invention

The present invention relates to a process for treating aqueous solutions comprising bases and organic acids. More particularly, the invention relates to a process for cleaning process water obtained from aldolization reactions.

2. Discussion of the Background

In many base-catalyzed condensation reactions of organic compounds, in particular, the reaction of aldehydes, carboxylic acids are formed as by-products, which neutralize some of the catalyst. One process of great industrial importance is, for example, the condensation of n-butyraldehyde to form 2-ethylhex-2-enal and water. In this case, the reaction mixture is customarily worked up as follows: In the first step, the product-containing organic phase is separated from the aqueous phase (catalyst solution and reaction water) in a settling tank. Because of the polarity of the organic acids formed in the side reactions and of the base used as catalyst, these two components are principally found in the aqueous phase. Direct feed of this aqueous phase to the effluent treatment plant is, therefore, frequently undesirable, because of the high concentrations of bases and organic constituents. In addition, because of the injection of the base from the process together with the aqueous phase, in order to maintain a constant catalyst concentration, fresh base must constantly be fed to the process, which is cost-intensive and contradicts the actual meaning of catalyst.

WO 92/07648 discloses a process for recovering sodium hydroxide solution from process waters of the above-mentioned type. In this process, the object of which is to treat the aqueous phase which is produced by the aldol condensation, cation-exchange membranes are used. The aqueous phase in this process comprises the sodium salts of the organic acid or alcohol formed as by-products of the aldol reaction. This solution is passed through the anode chamber in a two-chamber membrane electrolysis cell. When an electric field is applied, the metal cations migrate into the cathode chamber and react with hydroxide ions which form at the cathode to form sodium hydroxide. In this process, only the sodium hydroxide solution is separated for use as catalyst. In the anode circuit, an aqueous solution remains which predominantly comprises only the organic acid or alcohol. Disposal of this solution is complex, since the organic constituents are only present in low concentrations and the solution thus cannot be fed directly to the thermal disposal system. Recovery of the organic acids present in low concentrations is also not worthwhile.

DE 196 04 903 discloses a process for separating alkali metal hydroxide solution from the product formed in the aldol condensation, which process operates according to the principle of the three-chamber electrolysis or electrodialysis. In this process, the product-containing phase, after separation of the aqueous phase, is passed through the central chamber of the electrolysis cell, which is bounded by an anion-exchange membrane and a cation-exchange membrane. In the electric field, in the case of sodium hydroxide solution, the $Na^+$ ions migrate through the cation-exchange membrane and form, with the $OH^-$ ions produced at the cathode, sodium hydroxide solution in the cathode chamber. The $OH^-$ ions present in the central chamber migrate through the anion-exchange membrane into the anode chamber and react with the $H^+$ ions produced at the anode to form water. In this process, in order to separate sodium hydroxide solution, the base is moved from the product, but the base present in the aqueous phase and the organic constituents are not worked-up.

In the two above-mentioned processes, the phase to be treated is depleted in the course of the electrolysis or electrodialysis in dissolved metal hydroxide, and the conductivity of the solution decreases with advancing electrolysis or electrodialysis. This means that a constantly increasing power input becomes necessary to separate constituents still present in the aqueous solution.

Another process which is known for treating aqueous solutions comprising organic constituents is acidifying the solution until phase separation occurs. However, in this case, only the high-boilers are removed from the solution, while organic acids remain in the aqueous phase. In addition, further salting of mass streams of the aqueous solution is performed, which makes disposal more difficult.

SUMMARY OF THE INVENTION

Accordingly, one object of the present invention is to provide a simple process for treating aqueous solutions comprising bases and organic acids, which results in the separation of the bases and organic acids from the solution and converts to forms, together with the treated aqueous solution, which render them suitable for further processing or use.

Briefly, this object and other objects of the present invention as hereinafter will become more readily apparent can be attained in a process of treating aqueous solutions comprising bases and organic acids by simultaneously separating bases and organic acids by an electrochemical process.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
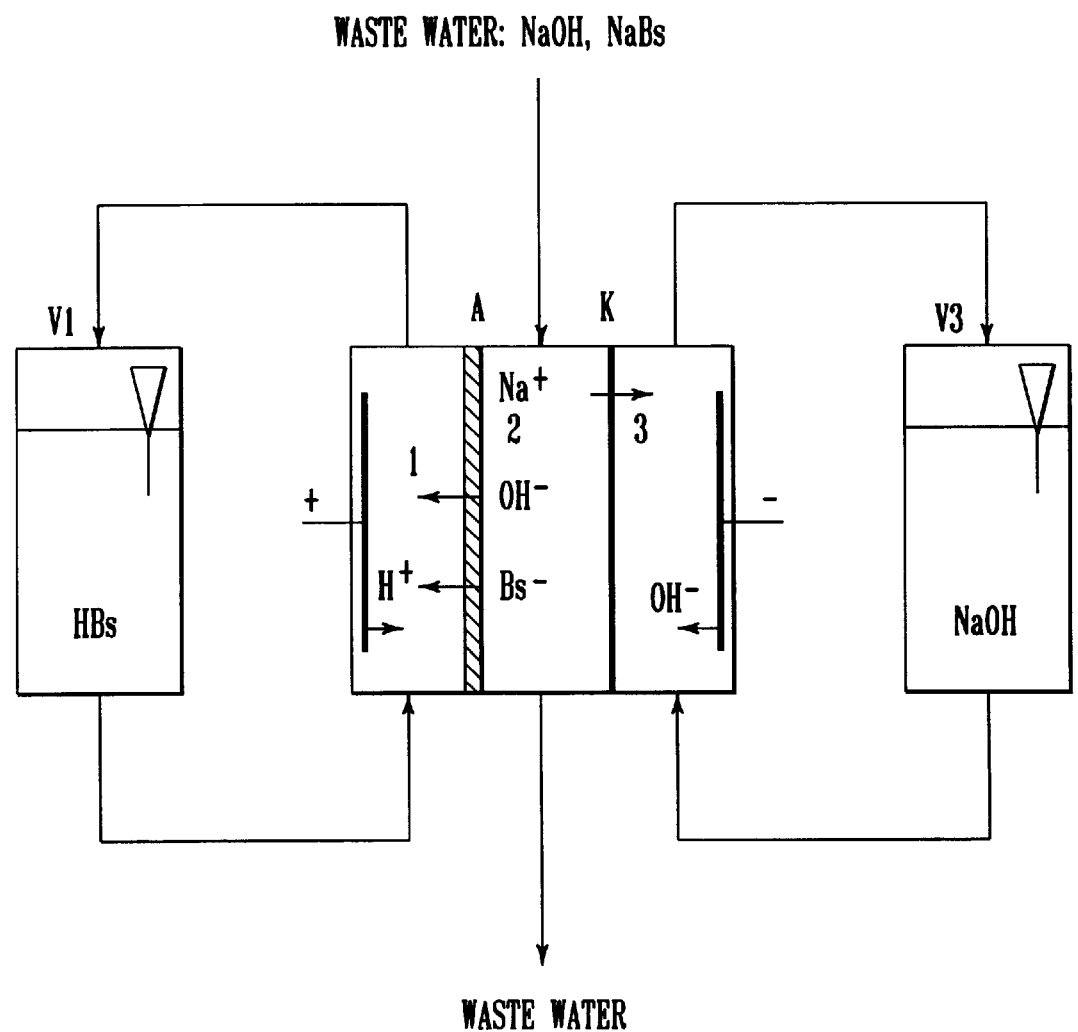
FIGS. 1 and 2 show embodiments of the electrolysis and electrodialysis methods, respectively, of conducting the separation process of the invention.

Independently of their origin, all aqueous solutions of bases and organic acids, but in particular those which are produced by the aldol reaction, can be treated by the electrochemical process of the invention.

In the instances of base-catalyzed aldol condensation reactions which are conducted in a known manner producing α, β-unsaturated carbonyl compounds, because of the stoichiometry of the reaction mechanism, 1 mole of water is produced per 2 moles of aldehyde or ketone employed as the reactant. In addition, the base is added as an aqueous solution to the reaction. After the reaction, an organic phase and an aqueous phase are present. In order to separate the desired product, generally, use is made of phase separation by means of a phase separator. The organic phase principally comprises the desired product, while the aqueous phase comprises the catalyst which has been employed and organic constituents, which are frequently produced by side reactions of the aldol condensation. An example of such a reaction, in particular, is the disproportionation reaction of aldehydes or ketones, which is also known as the Cannizarro reaction. In this reaction, two molecules of aldehyde or ketone produce one molecule of carboxylic acid and one molecule of alcohol, whose carbon chain length is dependent on the aldehyde or ketone used. The organic acids are readily water soluble up to a chain length of 5 carbon atoms, so that they principally remain in the aqueous phase during the phase separation. This aqueous solution of the basic catalyst and organic acids must usually be post-treated prior to being passed on or discharged into the environment. According to the invention, this treatment is performed by an electrochemical process which separates the bases and the organic acids from the aqueous solution.

The bases and organic acids are separated from aqueous solutions in the invention by two electrochemical process which are electrolysis and electrodialysis.

In the electrolysis method of conducting the invention, separation is achieved by introducing the aqueous solution to be treated into a chamber imposed between the anode and cathode chambers, the chamber being separated from the anode chamber by at least one anion-exchange membrane and from the cathode chamber by at least one cation-exchange membrane. Commercial membranes may be used. A suitable anion-exchange membrane is, for example, the AHA-2 membrane from Tokuyama Soda Ltd., while a suitable cation-exchange membrane is, for example, the C66 10 F membrane from Tokuyama Soda Ltd.

The cathode chamber is preferably incorporated into a reservoir circuit, in which the base, preferably the base already present in the solution to be treated, is charged. Fluid flow through the cathode chamber occurs counter-currently or cocurrently, preferably cocurrently, to the stream of solution through the central chamber. The anode chamber, in which organic acid, preferably the acid already present in the aqueous solution to be treated, is charged, is preferably likewise incorporated into a reservoir circuit. Fluid flow likewise passes through the anode chamber countercurrently or cocurrent, preferably cocurrently, to the stream of solution through the central chamber.

At least one electrode is positioned in each of the anode chamber and the cathode chamber, which is to say an anode in the anode chamber and a cathode the cathode chamber. The cathode consists of a material known in electrolysis, preferably steel. The anode preferably consists of steel, platinum black, platinum, graphite or mixed oxides, or it consists of a combination of these materials, pure or applied to or incorporated in a support material, preferably titanium.

In electrolysis an electrical voltage is applied to the electrodes thereby forming an electric field between the electrodes. Under the influence of the field, the cations, in the case, for example, of the base-catalyzed preparation of octenal from butanal using sodium hydroxide solution as base, the sodium ions migrate through cation-exchange membrane in the direction toward the cathode and the anions, preferably organic acid radicals, migrate through the anion-exchange membrane in the direction of the anode. At the cathode in the cathode chamber, the sodium ions together with the hydroxide ions formed at the electrode in accordance with the equation:

$$H_2O + 1e^- \rightarrow OH^- + 1/2 H_2$$

form sodium hydroxide solution. At the anode, the negatively charged acid radicals which have migrated into the anode chamber together with the H$^-$ ions formed at the electrode in accordance with the equation:

$$H_2O \rightarrow 2H^+ + 1/2 O_2 + 2e^-$$

react to form acid. As a result of the above-mentioned complementary electrolysis steps, the bases and organic acids are separated from the solution to be treated, which is in the central chamber, and comprise bases and organic acids, these bases and organic acids accumulating in the cathode chamber or the anode chamber (or if appropriate in the corresponding circuits), respectively. The process is, therefore, outstandingly suitable for the simultaneous treatment of aqueous solutions comprising bases and organic acids. Depending on the treatment period, an aqueous solution which is virtually completely freed of bases and organic acids is obtainable, which, without treatment, can be further used in the process or fed to an effluent treatment plant.

With advancing electrolysis, the aqueous solution in the central chamber is depleted in dissolved ions. The ionic concentration in the cathode chamber, in contrast, increases with advancing electrolysis, since the base formed in the case of NaOH immediately dissociates. In the anode chamber, the ionic concentration changes only insignificantly in the course of electrolysis, since the acid radicals which have migrated through the anion-exchange membrane recombine with the hydrogen ions formed at the anode. The ionic concentration in the anode chamber is, therefore, essentially dependent on the dissociation constant of the acid present in the acid chamber.

For the above-mentioned reasons, the conductivity at the start of electrolysis is high in the aqueous solution, whereas, in the anode and cathode chambers, it is low or determined by the concentration of base and organic acids of the solutions charged into the reservoirs. With advancing electrolysis the conductivity in the cathode chamber increases and, at constant current strength, approaches the maximum possible value calculated from the solubility product of the base. The conductivity in the anode chamber remains virtually constant during the course of electrolysis and is low in comparison to the conductivity in the cathode chamber. A preferred embodiment of the present process is, therefore, to increase the conductivity of the solution in the anode chamber by the addition of an acid, preferably a strong mineral acid such as sulfuric acid, or a base, preferably the base already present in the solution to be treated. This ensures that the ionic concentration and thus the conductivity in the anode circuit remains virtually constant over the entire treatment period and as a result a higher energy input is not necessary. The concentration of the base in the anode solution, preferably the same base which is present in the aqueous solution to be treated, ranges from 0.01–1 mol/l, in particular, however, from 0.1–0.5 mol/l. The conductivity of the aqueous solution to be treated is used as a measure of the progression of the process.

By setting a current density greater than from 100–200 A/m$^2$, two additional treatment effects can be achieved. Firstly, the Kolbe reaction at the anode can be exploited to split the organic acids into water-insoluble hydrocarbons electrochemically in accordance with the equations:

$$R\text{—}COO^- \rightarrow R\text{—} + 1e^- + CO_2 \text{ and } 2R\text{—} \rightarrow R\text{—}R$$

wherein R is any organic radical, by eliminating CO$_2$. Since the resulting hydrocarbons are primarily water-insoluble, they can be separated from the aqueous phase, for example, in a phase separator disposed in the anode circuit, and fed to disposal or further processing. By selection of the voltage supplied, there is also the possibility in this process, depending on which organic acids are formed in the aldolization process, of deciding whether, chiefly, the acid or a part of the acid, as hydrocarbon, which can be synthesized as shown in the above equation, is to be produced.

The second effect which the process according to the invention can exploit, depending on the manner in which it is conducted, is apparently based on an induced convection flow in the membranes. Surprisingly, during the electrolysis even neutral organic compounds separate from the aqueous solution to be treated. These compounds frequently occur as by-products in aldolization reactions in the aqueous phase in addition to the bases and organic acids. Because of this effect, the neutral organic compounds migrate together with the ions, when an electric field is applied through the anion-exchange membrane or the cation-exchange membrane from the central chamber, which contains the aqueous solution to be treated, into the anode chamber or cathode chamber, where they can likewise be separated by phase separation. The neutral organic compounds thus obtained can again be fed to a separate disposal or further processing.

Figure 2:
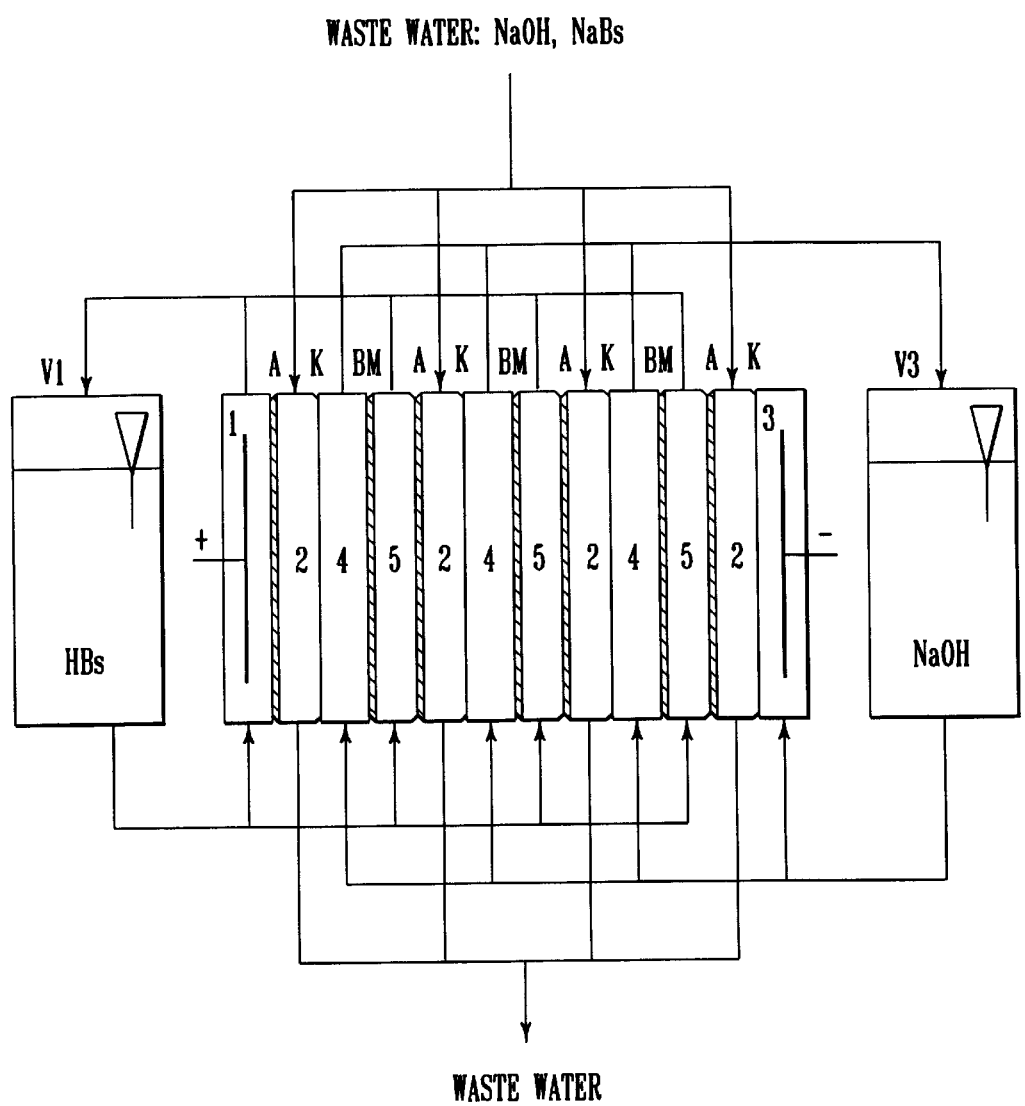

The second way of conducting the separation of the invention is electrodialysis, which is preferably used if relatively large volumes of solutions are to be treated or treatment of the solution comprising bases and organic acids is to be performed in a relatively short time. For this purpose, the number of chambers in the electrolysis module is increased in such a manner that, between the outer chambers which receive the electrodes, which correspond to the electrode containing chambers of the electrolysis procedure of the invention, instead of one chamber which comprises the solution to be treated, a number of chambers X is positioned between the outer chambers, consistent with the expression: $X=1+3\cdot n$, where n is a variable which can be any natural number and 0. These chambers are disposed in such a manner that at least one chamber, which comprises the solution to be treated, is positioned next to the electrode chambers. For n=0, x has the value 1, which is equivalent to the apparatus configuration in which electrolysis aspect of the invention is conducted. For n=1, X takes the value 4, which means that the anode chamber is followed firstly by a chamber comprising the aqueous solution to be treated, then a chamber holding a base, then a chamber holding an acid and finally again a chamber containing the aqueous solution to be treated. A cathode chamber completes the apparatus at the end of the module. For n is greater than 1, the electrodialysis module is correspondingly extended by n units consisting of base chamber, an acid chamber and a chamber comprising the solution to be treated. FIG. 2 shows an electrodialysis module in which n takes the value 3.

Just as in the case of the apparatus employed to conduct the separation by electrolysis, in the case of the electrodialysis, the apparatus employs a cathode chamber and a base chamber, which are to receive the base, the two being used jointly or separately, preferably jointly, in a reservoir circuit in which base, preferably the base which is already present in the solution to be treated, is charged. The flow of fluid passes through the cathode chamber countercurrently or cocurrently, preferably cocurrently, to the stream in the chambers containing the solution to be treated. The flow likewise passes through the base chambers countercurrently or cocurrently, preferably cocurrently, to the flow in the chambers bearing the solution to be treated. The anode chamber and the chambers receiving the acid are preferably incorporated jointly or separately, preferably jointly, into a reservoir circuit in which acid, preferably the acid which is already present in the aqueous solution to be treated, is charged. The flow passes through the anode chamber countercurrently or cocurrently, preferably cocurrently, to the flow in the chambers bearing the solution to be treated. The flow likewise passes through the acid chambers countercurrently or cocurrently, preferably cocurrently, to the flow in the chambers bearing the solution to be treated.

Whereas the anode chambers are separated from the chamber comprising the solution to be treated, preferably, by an anion-exchange membrane, and the cathode chambers are separated from the chamber comprising the solution to be treated, preferably, by a cation-exchange membrane, bipolar membranes are used in the invention to separate directly adjacently disposed base- or acid-receiving chambers. In the electric field, these membranes produce $H^+$ and hydroxide ions, which are released into adjacent acid- or base-circuit chambers. The base chambers are separated by cation-exchange membranes from the chambers bearing the aqueous solution to be treated, and the acid chambers are separated by anion exchange membranes from the chambers bearing the aqueous solution to be treated. Commercial membranes can be used. Suitable anion-exchange membranes include, for example, the AHA-2 membrane from Tokuyama Soda Ltd., while suitable cation-exchange membranes include, for example, the C66 10F membrane from Tokuyama Soda Ltd. Suitable bipolar membranes include membranes from Aqualytics or Tokuyama Sode Ltd.

Applying an electric voltage produces an electric field between the electrodes. Under the influence of the field, the cations, in the case, for example, of the base-catalyzed preparation of octenal with butanol using sodium hydroxide solution as base, the sodium ions migrate through the cation-exchange membrane in the direction of the cathode to the cathode or to a bipolar membrane, and the anions, preferably organic acid radicals, migrate through the anion-exchange membrane in the direction of the anode to the anode or to a bipolar membrane. At the cathode in the cathode chamber and at the bipolar membranes on the base circuit side, the sodium ions together with the hydroxide ions which are formed at the cathode in accordance with the equation:

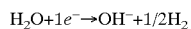

or at the bipolar membranes by cleavage of water into $OH^-$ and $H^+$ ions, form sodium hydroxide solution. At the anode or at the bipolar membranes, the negatively charged acid radicals which have migrated into the anode chamber or the acid chamber react with the $H^+$ ions formed at the anode in accordance with the equation:

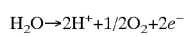

or at the bipolar membranes by cleavage of water into $OH^-$ and $H^+$ ions to form the acid. By means of the above-mentioned processes, the bases and organic acids are separated from the solution to be treated which comprises bases and organic acids and the bases accumulate in the cathode chamber and in the base chambers, and the organic acids accumulate in the anode chamber and in the acid chambers. The process is, therefore, outstandingly suitable for the simultaneous treatment of relatively large volumes of aqueous solutions comprising bases and organic acid. Depending on the treatment duration and intensity, an aqueous solution is formed which is virtually completely free from bases and organic acids and which, without further treatment, can be further processed or fed to an effluent treatment plant.

With continuing electrodialysis, the aqueous solution in the chambers bearing the solution to be treated is depleted in dissolved ions. The ionic concentration in the cathode chamber and in the base chambers, in contrast, generally increases with continuing electrodialysis, since the base formed usually dissociates immediately. In the anode chamber and in the acid chambers, the ionic concentration changes only insignificantly in the course of the electrodialysis, since the acid radicals which have migrated through the anion-exchange membrane recombine with the hydrogen ions formed at the anode or at the bipolar membranes. The ionic concentration is, therefore, essentially dependent on the dissociation constant of the acid present in the acid chambers.

For the above-mentioned reasons, the conductivity at the start of the electrolysis is high in the aqueous solution, whereas, in the anode and cathode chambers, or in the acid and base chambers, it is low or determined by the concentration of bases and organic acids in the solutions charged into the reservoirs. As the electrolysis continues, the conductivity increases in the cathode chamber and in the base chambers and at constant current strength approaches the maximum possible value. The conductivity in the anode chamber and in the acid chambers remains generally virtually constant in the course of the electrolysis and is low compared with the conductivity in the cathode chamber and in the base chambers. According to the invention, therefore, in a preferred embodiment of the process of the invention, a base is added, as in the case of the electrolysis, to increase the conductivity of the solution in the anode chamber and in the acid chambers. Adding bases to the anode chamber and to the acid chambers, therefore, ensures that the ionic concentration and thus the conductivity remains virtually constant in the anode circuit over the entire period of treatment and, as a result, a higher energy input is not required. The concentration of the base in the anode solution or in the acid circuit, preferably the same base which is present in the aqueous solution to be treated, ranges, preferably from 0.01–1 mol/l, particularly from 0.1–0.5 mol/l. The conductivity of the aqueous solution to be treated is used as a measure of the progression of the process.

By setting a current density according to the invention above 100–1,000 A/m², two additional treatment effects can be achieved. Firstly, the Kolbe reaction at the anode can be exploited to split the organic acids electrochemically into water-insoluble hydrocarbons according to the equations:

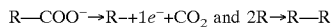

$$R\text{—}COO^- \rightarrow R\text{—}+1e^-+CO_2 \text{ and } 2R\rightarrow R\text{—}R$$

wherein R is any organic radical by eliminating $CO_2$. Since the resulting hydrocarbons are chiefly water-insoluble, they can be readily separated from the aqueous phase, for example, in a phase separator disposed in the anode circuit, and fed to disposal or further processing. By selecting the voltage applied, there is, therefore, the possibility with this process of deciding, depending on which organic acids are formed in the aldolization process, whether the acid or a part of the acid as a hydrocarbon which can be synthesized as specified in the equation above. Since the Kolbe reaction only takes place directly at the anode, in the case if the electrodialysis mode of the invention, only a small part of the acid can be converted into a hydrocarbon.

The second effect which the process of the invention, depending on how it is conducted, can exploit, is apparently based on an induced convection flow in the membranes. Surprisingly, during the electrolysis, even neutral organic compounds are separated from the aqueous solution to be treated. These compounds frequently occur in the aqueous phase in addition to the bases and organic acids as by-products in the aldol reactions. As a result of the above-mentioned effect, the neutral organic compounds together with the ions migrate through the anion-exchange membrane or the cation-exchange membrane from the chamber which comprises the aqueous solution to be treated into the anode and cathode chambers or the base and acid chambers where they can likewise be separated by phase separation. The neutral organic compounds thus obtained can again be fed to disposal or further processing.

Preferably, the bases, after separating them from the aqueous solution to be treated, are taken up outside the cell by pure bases charged there and in this manner concentrated and recovered. The bases worked-up in this manner are preferably fed back to the aldolization process as catalyst. The organic constituents in the acid circuit, which separate from the aqueous solution to be treated are concentrated and either fed directly to thermal disposal or are further processed, e.g. separated by means of a phase separator into water-soluble and water-insoluble compounds and disposed of or further processed individually. The aqueous solution treated in the invention can be fed to an effluent treatment plant, to a combustion unit or to further processing.

The process of the invention is preferably conducted at atmospheric pressure and preferably at temperatures ranging from 20–90° C., particularly preferably from 30–60° C.

The process according to the invention can be conducted continuously or batchwise by the electrolysis or electrodialysis method. The strength of the electric field applied is dependent, inter alia, on equipment conditions material pairs, and must be dimensioned in such a manner that the effect of the invention is achieved. Preferably, a current density of from 100–1000 A/m² is used.

FIG. 1 shows an example of the electrolysis method of separation of the process of the invention. The electrolysis module is divided into three chambers 1, 2 and 3 by an anion-exchange membrane A and a cation-exchange membrane K. The aqueous solution to be treated, in this example a waste water stream which comprises NaOH and the sodium salt of butyric acid, NaBs, flows through the central chamber 2. The anode chamber 1, in which is disposed the anode indicated by +, is incorporated into a reservoir circuit and a solution comprising the organic acid HBs, which is charged from the reservoir V1, flows therethrough. The cathode chamber 3, in which the cathode indicated by − is disposed, is incorporated into a reservoir circuit and an NaOH containing solution, which is charged from the reservoir V3, flows through it. In the electric field, the Na⁺ ions migrate through the cation-exchange membrane K into the cathode chamber 3, where, with the OH⁻ ions formed at the cathode (−), they form sodium hydroxide solution. The H⁺ ions formed at the anode (+) react with the anions OH⁻ and Bs⁻ which have migrated through the anion-exchange membrane A, to form organic acid and water.

An embodiment of the electrodialysis method of conducting the process of/the invention is shown in FIG. 2. The electrolysis module is divided by four anion-exchange membranes A, four cation-exchange membranes K and three bipolar membranes BM into a cathode chamber 1, an anode chamber 3, four chambers 2 bearing solution to be treated, three base chambers 4 and three acid chambers 5. The aqueous solution to be treated, in this example a waste water stream which comprises NaOH and the sodium salt of butyric acid NaBs, flows through the chambers 2. A solution comprising the organic acid HBs, which is charged from the reservoir V1, flows concurrently through the anode chamber 1, in which is disposed the anode indicated by (+), and the acid chambers 5. The solutions exiting from the acid chambers 5, through which the flow passes concurrently to the chambers 2, combine, after flowing through the chambers, with the solution from the anode chamber and are collected again in a reservoir V1. From this reservoir, the solution is passed to the chambers, with the solution being divided over chambers 1 and 5. The cathode chamber 3, in which is disposed the cathode marked by (−), is fed concurrently by a solution comprising NaOH, which solution is charged, from the reservoir V3. The base chambers 4 are likewise fed concurrently by the solution charged in the reservoir V3. The solutions of the cathode chamber and the base chambers combine, after flowing through the electrodialysis module, and are collected again in the reservoir V3. In the electric field, the Na+ ions migrate from the chambers 2 through the cation-exchange membrane K into the cathode chamber 3 or into the base chamber 4, where, together with the OH⁻ ions formed at the cathode (−) and the bipolar membranes BM, they form sodium hydroxide solution. The H⁻ ions formed at the anode (+) or at the bipolar membranes BM react with the anions OH⁻ and Bs⁻ which have migrated through the anion-exchange membrane A from the chambers 2 into the chamber 1 or the chambers 5, to form organic acid and water.

Having now generally described the invention, a further understanding can be obtained by reference to certain specific Examples which are provided herein for purpose of illustration only and are not intended to be limiting unless otherwise specified.

EXAMPLES

Example 1

Purification of the Reaction Water from Octenal Production

Electrolysis was conducted at a temperature of from 40–50° C. at a current density of 350 A/m² in a three-chamber electrolysis module as shown in FIG. 1, whose chambers are separated by an anion-exchange membrane of type AHA-2 and a cation-exchange membrane of type C66 10F from Tokuyama Soda Ltd., each of which have a membrane area of 100 cm², An anode of titanium coated with mixed oxide having a surface area of 100 cm² and a cathode of expanded stainless steel metal having a surface area of 100 cm² completed the cell. In the anode circuit, a 1% strength aqueous sodium hydroxide solution was charged, and in the cathode circuit a 5% strength aqueous butyric acid solution was charged. In the central chamber, octenal waste water which comprised, inter alia, butyric acid and various aldehydes, was circulated. The conductivities of the solutions were determined constantly during the entire electrodialysis operation using a measuring instrument from WTW.

Figure 3:
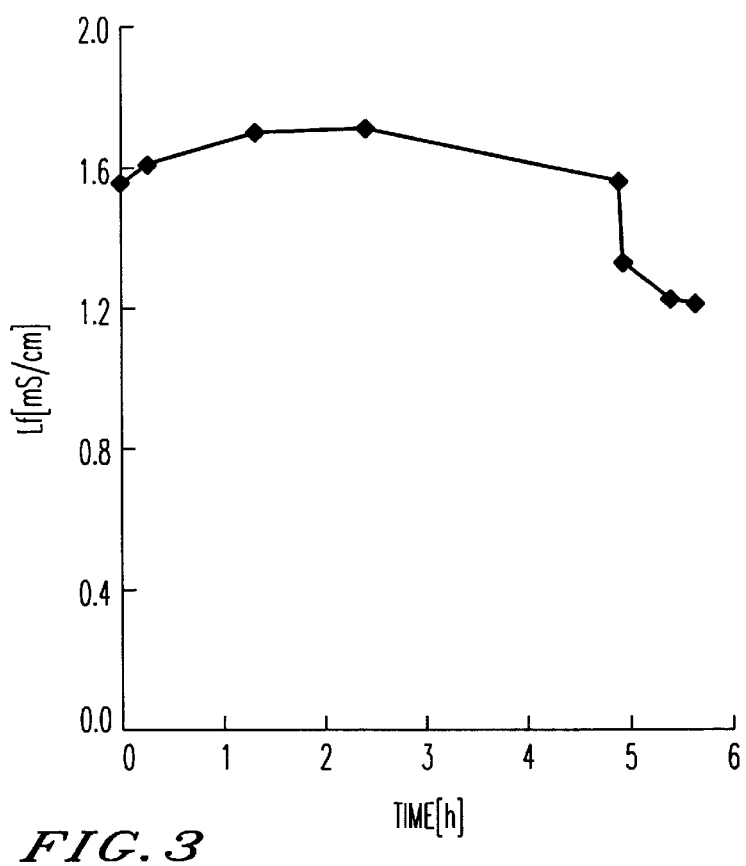
FIGS. 3–5 show the course of conductivity in each of the anode, solution and cathode chambers of the electrolysis apparatus of Example 1.
Figure 4:
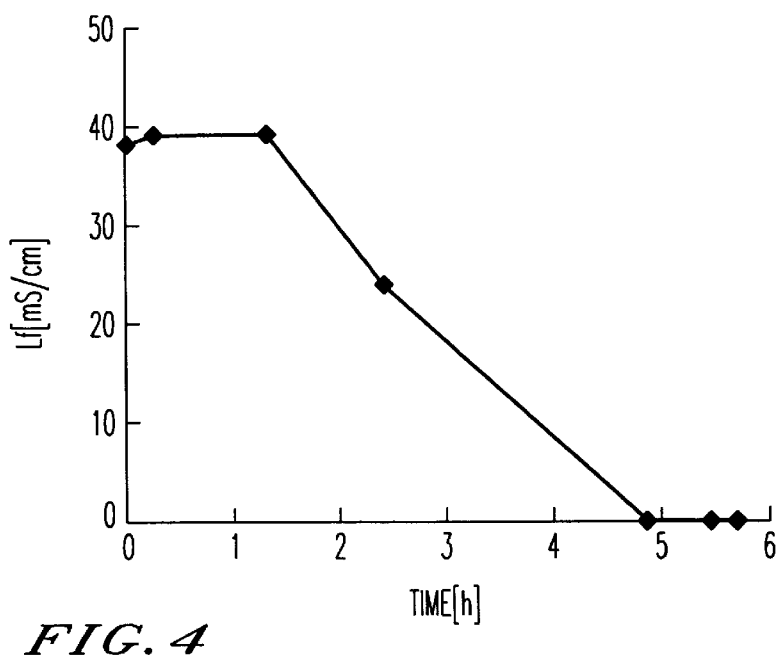
Figure 5:
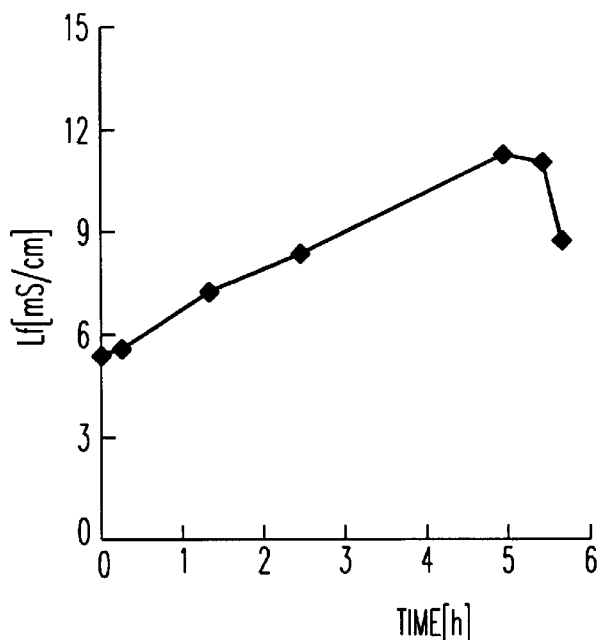

During the course of the electrodialysis, the conductivity in the octenal circuit decreased to very low values (0.1 mS/cm). In the anode circuit, the conductivity remained virtually constant, whereas in the cathode circuit the conductivity increased with increasing duration of the electrodialysis up to a maximum value of >180 mS/cm. FIGS. 3–5 show the time course of the conductivities in the three chambers. FIG. 3 shows the course of conductivity in the anode chamber, FIG. 4 shows the course of conductivity in the chamber comprising the solution to be treated and FIG. 5 gives the course of conductivity in the cathode chamber.

At the start and finish of the electrolysis, samples were taken from the central chamber and the total carbon content and sodium content of the solution were determined. The measured values are presented in the table below.

TABLE 1

| Analyses of total carbon content | | | |
|---|---|---|---|
| Sample 1 (start of electrolysis) | 0.93 | % C | 8.77 g carbon |
| Sample 2 (finish of electrolysis) | 0.098 | % C | 0.81 g carbon |
| Analyses of sodium content | | | |
| Sample 1 (start of electrolysis) | 1.4 | % Na | 13.20 g sodium |
| Sample 2 (finish of electrolysis) | 0.01 | % Na | 0.08 g sodium |

The marked decrease in total carbon content in the central chamber is particularly noticeable. Thus, in the course of the electrolysis, the carbon content decreased from 0.93–0.098%. This is all the more important, since actually only 0.6% was charged as organic acid, and thus the residual carbon content attributable to neutral organic compounds was 0.33%. Since the final content was markedly less than this value, this fact indicates that even neutral organic compounds migrate from the central chamber through the membranes.

Example 2

An electrodialysis was conducted using the same experimental parameters in an electrodialysis module as shown in FIG. 2. In addition, in this example, sodium hydroxide solution was added to the butyric acid in the anode or acid circuit until the pH was approximately 6.0. Measurement of the conductivity in the anode or acid circuit showed a significantly higher conductivity compared with that determined in Example 1. The measured value of conductivities in the three circuits are shown plotted graphically against the experimental time in FIGS. 6–8.

Figure 6:
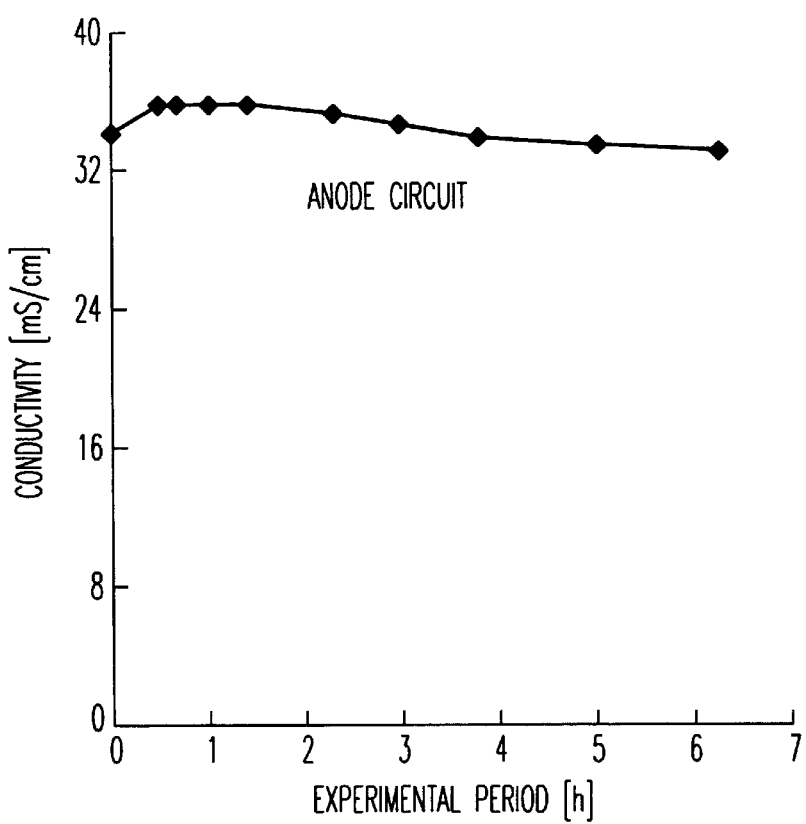
FIGS. 6–8 show the course of conductivity in each of the anode, solution and cathode chambers of the electrolysis apparatus of Example 2.
Figure 7:
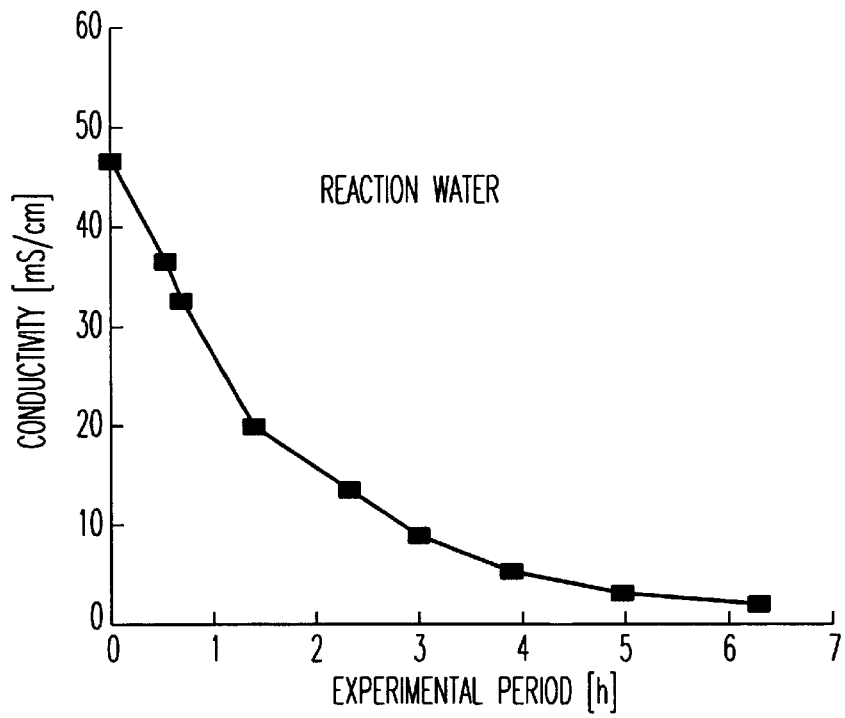
Figure 8:
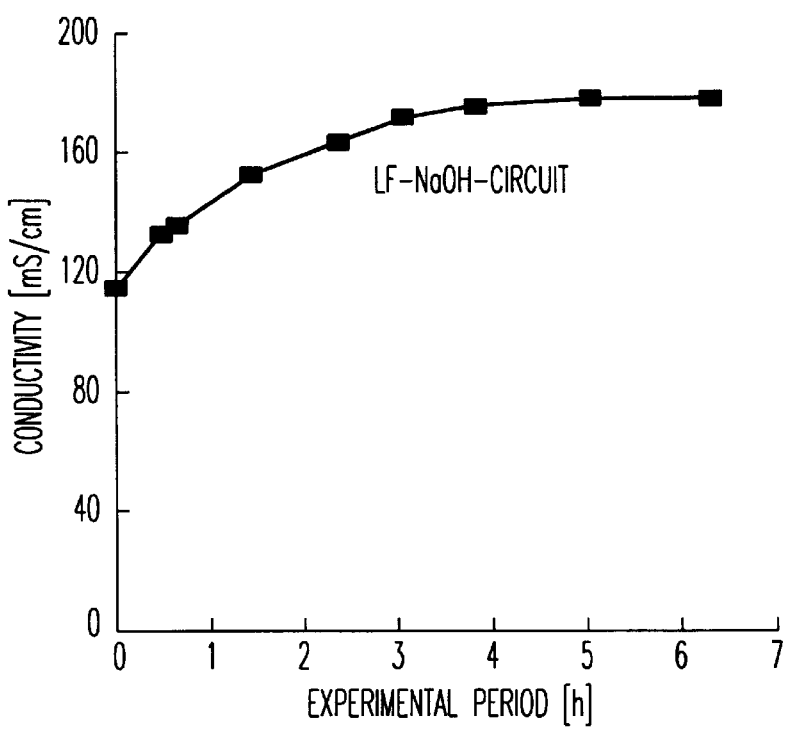

FIG. 6 shows the course of conductivity in the anode chamber of the acid chambers, FIG. 7 shows the course of conductivity in the chambers comprising the solution to be treated and FIG. 8 shows the course of conductivity in the cathode chamber or base circuit. The addition of sodium hydroxide solution to the acid circuit, therefore, causes a substantially higher and virtually constant conductivity in the anode chamber. As a result, the required total energy input to treat the aqueous solution is halved.

The disclosure of German priority Application Number 19849922.1 filed Oct. 29, 1998 is hereby incorporated by reference into the present application.

Obviously, numerous modifications and variations of the present invention are possible in light of the above teachings. It is, therefore, to be understood that within the scope of the appended claims, the invention may be practiced otherwise than as specifically described herein.

What is claimed as new and is intended to be secured by Letters Patent is:

1. A process, comprising:
   simultaneously, electrochemically separating a basic catalyst and an organic acid from an aqueous solution;
   wherein said aqueous solution is produced in aldolization reaction.

2. The process as claimed in claim 1, wherein said basic catalyst and said organic acid are simultaneously separated by electrolysis.

3. The process as claimed in claim 2, wherein said solution is introduced into a chamber 2 of an apparatus;
   wherein said chamber 2 is disposed between an anode chamber 1 and a cathode chamber 3;
   wherein said chamber 2 is separated from the anode chamber 1 by at least one anion-exchange membrane; and wherein said chamber 2 is separated from the cathode chamber 3 by at least one cation exchange membrane.

4. The process as claimed in claim 3, wherein a base in an amount of 0.01–1 mol/l is added to the aqueous solution in said anode chamber.

5. The process as claimed in claim 1, wherein said basic catalyst and said organic acid are simultaneously separated by electrodialysis.

6. The process as claimed in claim 5, wherein said apparatus further comprises chambers 4 and 5;

wherein said chambers 4 and 5 serve as reservoirs for receiving cations or anions from said solution;

wherein said chambers 4 and 5 are fed with said solution; and wherein said chambers 4 and 5 are separated by a bipolar membrane.

7. The process as claimed in claim 6, wherein a number of chambers between chambers containing an electrode is $X=1+3 \cdot n$.

8. The process as claimed in claim 6, wherein the acid to which a base is added is charged into the chambers which serve to receive the anions.

9. The process as claimed in claim 1, wherein said process is performed in an apparatus having an anode and a catode as electrodes; and wherein a current density of 100–1000 A/m$^2$ is applied across the electrodes of said apparatus.

10. The process as claimed in claim 9, wherein said electrodes comprise steel, platinum black, graphite, mixed oxide, pure platinum, a support material or a combination thereof.

11. The process as claimed in claim 1, further comprising seperating a neutral organic compound from solution.

12. The process as claimed in claim 1, wherein the process is conducted at a temperature of from 20 to 90° C.

13. The process as claimed in claim 12, wherein the separation process is conducted at temperature of from 30 to 60° C.

14. The process as claimed in claim 1, wherein the process is conducted continuously.

15. The process as claimed in claim 1, wherein the process is conducted batchwise.

16. The process as claimed in claim 1, wherein organic compounds are split electrochemically at the anode.

17. A process, comprising:

simultaneously, electrochemically separating a basic catalyst and an organic acid from an aqueous solution;

wherein said aqueous solution is produced in aldolization reaction;

wherein a base in an amount of 0.01–1 mol/l is added to the aqueous solution in said anode chamber.

18. A process, comprising:

simultaneously, electrochemically separating a basic catalyst and an organic acid from an aqueous solution;

wherein said aqueous solution is produced in aldolization reaction;

wherein the acid to which a base is added is charged into the chambers which serve to receive the anions.

19. A process, comprising:

simultaneously, electrochemically separating a basic catalyst and an organic acid from an aqueous solution; and separating a neutral organic compound from said solution wherein said aqueous solution is produced in aldolization reaction.

20. A process, comprising:

simultaneously, electrochemically separating a basic catalyst and an organic acid from an aqueous solution;

wherein said aqueous solution is produced in aldolization reaction;

wherein organic compounds are split electrochemically at the anode.

* * * * *